Dec. 27, 1932.  C. L. SNYDER  1,892,589
DECKING STRUCTURE
Filed April 17, 1931   3 Sheets-Sheet 2
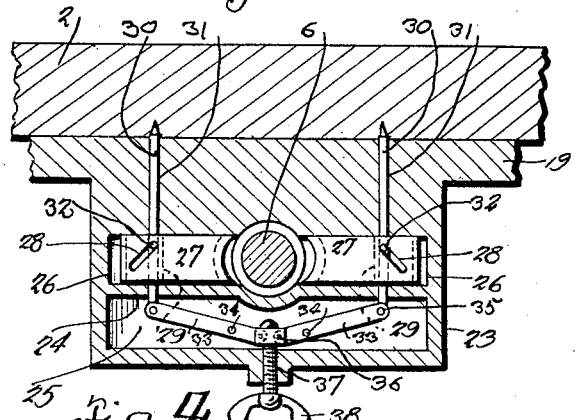
Inventor
Clifford L. Snyder.
By
Attorney Dec. 27, 1932.　　　C. L. SNYDER　　　1,892,589
DECKING STRUCTURE
Filed April 17, 1931　　　3 Sheets-Sheet 3
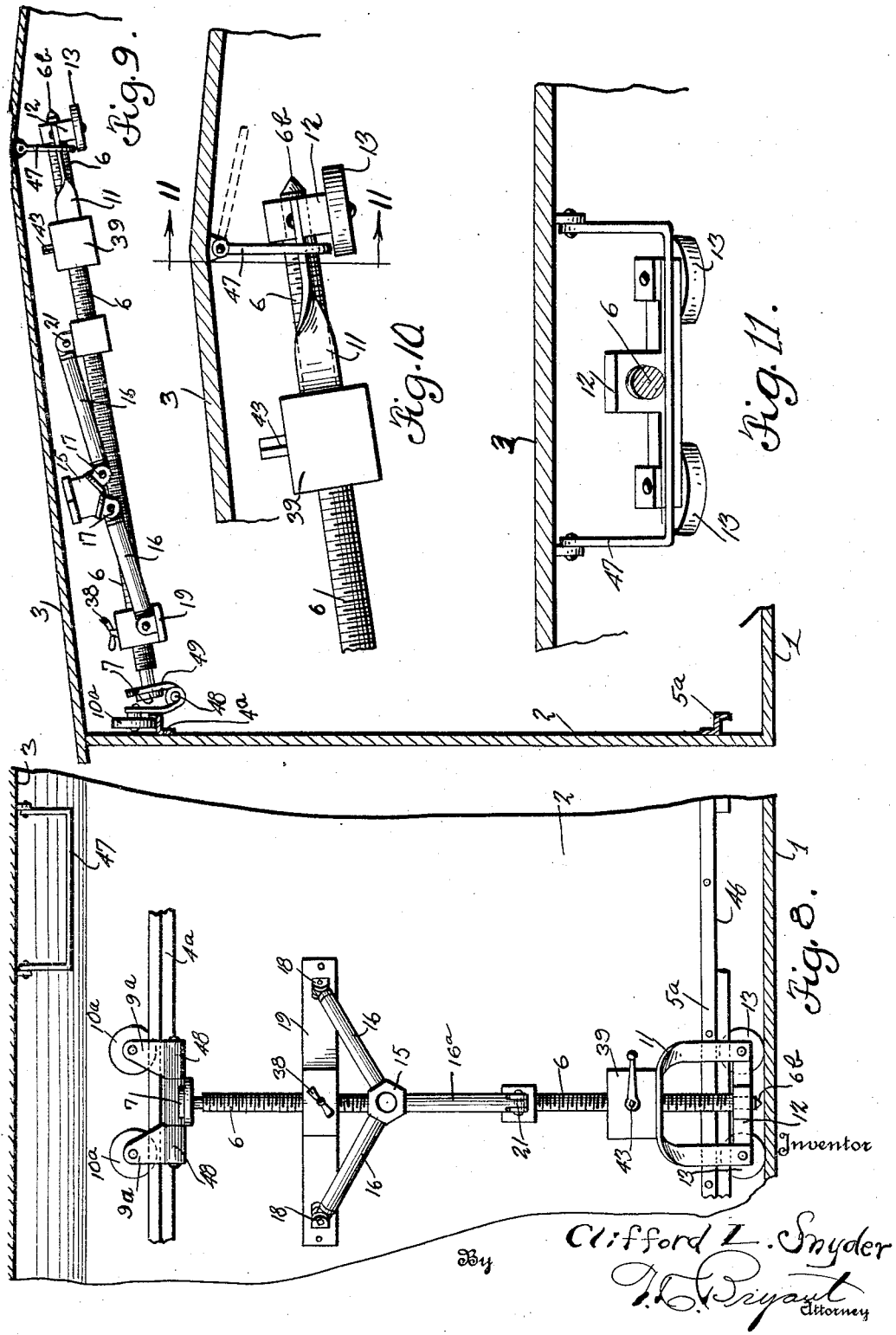

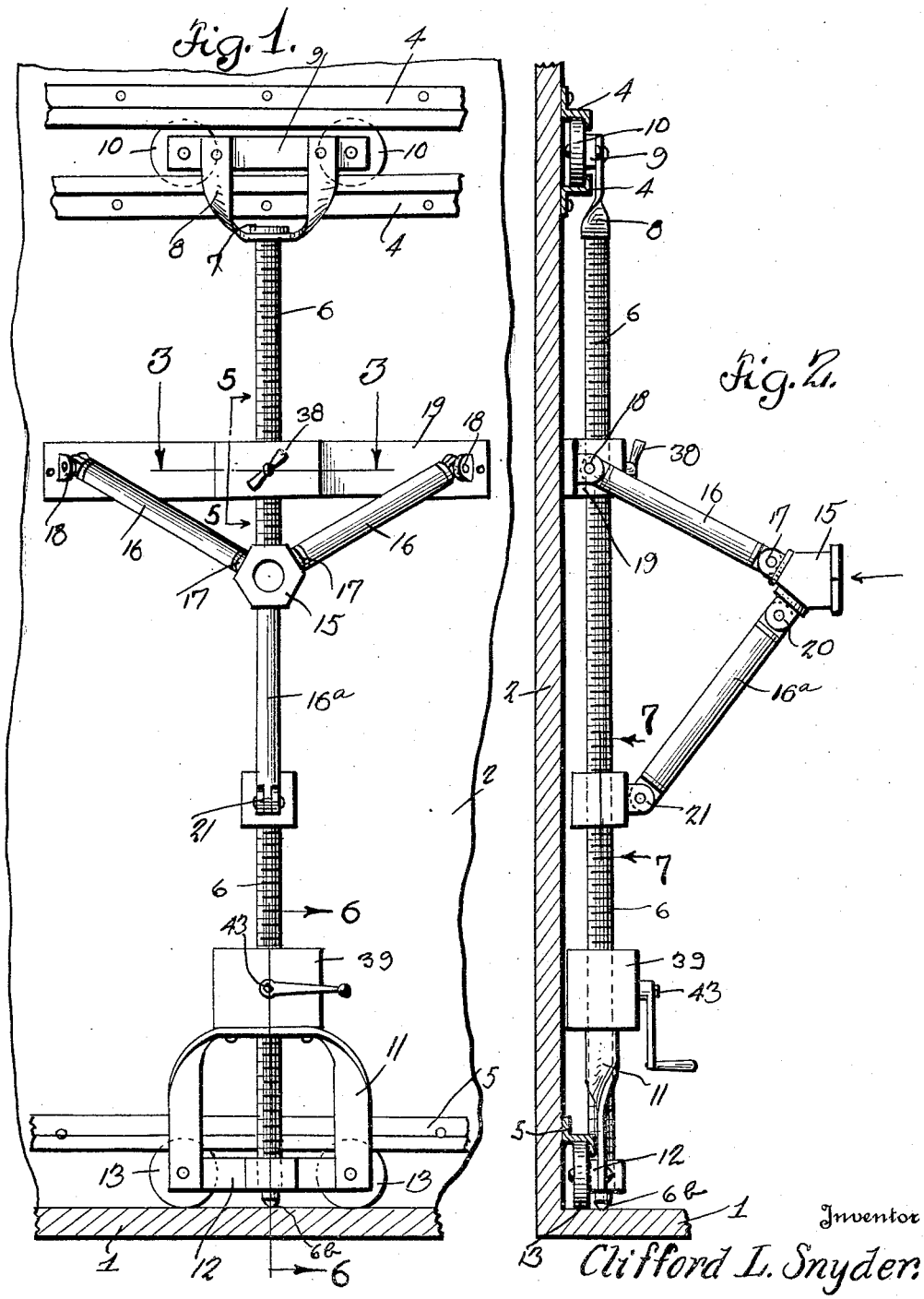

Patented Dec. 27, 1932

1,892,589

UNITED STATES PATENT OFFICE

CLIFFORD L. SNYDER, OF DETROIT, MICHIGAN, ASSIGNOR TO EVANS PRODUCTS COMPANY, OF DETROIT, MICHIGAN, A CORPORATION OF DELAWARE

DECKING STRUCTURE

Application filed April 17, 1931. Serial No. 530,992.

This invention relates to certain new and useful improvements in decking structures.

The primary object of this invention is to provide a decking structure for the shipment of motor vehicles in freight cars and the like, the decking structure being of a character permitting shifting movements thereof longitudinally of a car structure, and guided in said movement by track rails carried by the side walls of the car.

A further object of the invention is to provide a decking structure of the foregoing character wherein the deck head and associated brace arms are supported upon a screw shaft or standard that is operable for raising and lowering the deck head as well as shifting the head toward and away from a side wall of the car to position the same for the support of an automobile, the screw shaft or standard when an automobile is supported by the deck head, having its lower end impinging the car floor for anchoring the decking structure against longitudinally shifting movement.

It is a further object of this invention to provide a decking structure as above set forth with a pivotal support for its upper end and with the lower end disengageable from guide rails to be swung upwardly so that the decking structure may occupy a position adjacent the roof of the car and be there supported when out of use.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a fragmentary elevational view of a car wall with the floor thereof shown in section and with the decking structure shown in front elevation, the latter being illustrated in automobile supporting position;

Figure 2 is a side elevational view of the decking structure with the car shown in section and illustrating the screw shaft or standard upon which the deck head and supporting arms are mounted;

Figure 3 is a detail horizontal sectional view taken on line 3—3 of Figure 2, showing the cross arms at the upper end of the decking structure anchored to the wall of the car with the screw jaws carried by the cross arms disengaged from the screw shaft permitting rotation of the screw shaft without operating the cross arms;

Figure 4 is a horizontal sectional view, similar to Figure 1, showing the cross arms disengaged from the car walls and the screw jaws engaged with the screw shaft;

Figure 5 is a cross-sectional view taken on line 5—5 of Figure 1;

Figure 6 is a fragmentary longitudinal sectional view taken on line 6—6 of Figure 1, showing the operating mechanism for the screw shaft;

Figure 7 is a fragmentary longitudinal sectional view taken on line 7—7 of Figure 2, showing the bearing block for the lower brace rod of the deck head threaded on the screw shaft;

Figure 8 is a fragmentary side elevational view, partly in section of a car structure with a decking apparatus associated therewith and including a pivotal support for the upper end of the screw shaft;

Figure 9 is a fragmentary cross-sectional view of the car structure showing the decking apparatus swung upwardly to occupy a position adjacent the car roof when out of use;

Figure 10 is an enlarged detail sectional view of a part of the car structure showing the retaining link for the free swinging end of the decking apparatus; and Figure 11 is a cross-sectional view taken on line 11—11 of Figure 10.

The decking structure is associated with a freight car, parts of which are illustrated, the reference numeral 1 designating the car floor, the numeral 2 designating a side wall while the car roof is shown at 3. As illustrated in Figures 1 to 7, the decking structure comprises a screw shaft or standard carrying a roller frame at its upper and lower ends associated with guide rails, there being provided a pair of upper guide rails 4 adjacent the roof of the car that are secured to the side wall 2 while a single lower guide rail 5 is provided on the side wall adjacent the floor 1. The vertical screw shaft 6 of the decking structure is headed as at 7 at its upper end and is carried by a resilient metallic strap 8 of substantially U-shape formation with the upwardly directed ends thereof attached to a frame bar 9 that carries a roller 10 adjacent each end thereof that is disposed between the spaced guide rails 4. The lower carriage comprises an inverted U-shaped metallic strap 11 having its lower ends attached to a frame bar 12 that carries end rollers 13 riding upon the car floor 1 and confined by the flange of the lower guide rail 5, the intermediate portion of the lower frame bar 12 being enlarged to provide a block 14 having an opening therein through which the unthreaded lower end 6a of the screw shaft extends as shown in Figure 6, the terminal conical lower end of the screw shaft being normally spaced from the car floor 1. It will be understood that the vertical screw shaft 6 with the wheeled frames at the upper and lower ends thereof is shiftable longitudinally of the side wall 2 of the car, being guided by the rails 4 and 5 for conveniently positioning the same relative to an automobile to be carried thereby.

The decking structure further includes a deck head 15 in which a part of an automobile, such as a well hub or axle end is supported, a pair of upwardly directed divergent arms 16 being pivotally connected to the head as at 17 with the other ends thereof pivotally connected as at 18 to a cross arm 19 associated with the screw shaft 6 and car wall 2, a single lower brace arm 16a being pivotally connected as at 20 to the decking head 15 at one of its ends while the other end thereof is pivotally connected as at 21 to a block 22 through which the screw shaft 6 threads as shown in Figure 7.

Means is embodied in the cross arm 19 for securing the same to the car wall 2 and for breaking connection between the same and the screw shaft 6, and also disengaging the arm from the car wall and engaging the same with the screw shaft, this means including a casing 23 carried by the arm 19 intermediate the ends thereof with a cross wall 24 therein defining compartments 25 and 26, the screw shaft 6 extending through the compartment 26. A pair of screw jaws 27 are slidably mounted in the compartment 26 and are adapted to be moved into and out of engagement with the screw shaft 6 and to accomplish sliding movement of the screw jaws 27, each jaw is provided with an inclined slotted opening 28 formed at its upper and lower sides adjacent the outer end thereof as shown in Figures 3 to 5 and communicating with a horizontal opening 29 extending through the screw jaws 27. A pin 30 extending through an opening in the partition 24 and passing through the slot 29, also passes through an opening 31 in the cross arm 19 and said pin 30 carries diametrically opposite lugs 32 extending into the inclined slots 28. A pair of levers 33 pivotally mounted as at 34 in the compartment 25 are respectively connected at their outer ends as at 35 to the adjacent end of a pin 30, the adjacent ends of levers 33 being pivotally connected to a block 36 in which one end of a screw 37 threaded through the casing 23 is swiveled, the outer end of the screw 37 carrying a thumb nut 38 for operation of the levers 33 and pins 30. When the pins 30 are in the positions illustrated in Figure 3, the opposite ends thereof are engaged with the car wall 2 for locking the cross arms 19 against movement, the latter being flatly engaged with the car wall, while the screw jaws 27 are shifted to positions spaced from the screw shaft 6. By operating the screw 37, the levers 33 shift the pins 30 as shown in Figure 4 to disengage the pins from the car wall 2 and the lugs 32 moving through the inclined slots 28 shift the screw jaws 27 into engagement with the screw shaft to effect raising and lowering movement of the cross arm 19 when the screw shaft 6 is rotated.

The mechanism for effecting rotation of the screw shaft 6 includes a casing 39 secured to the lower carriage strap 11 as shown in Figures 1, 2 and 6 and through which casing the screw shaft 6 freely extends, the screw shaft within the casing 39 having an unthreaded portion 40 upon which a bevel gear 41 is splined as at 42. A stub shaft 43 journalled in a side wall of the casing 39 carries a bevel gear 44 upon its inner end meshing with the bevel gear 41, the outer end of the stub shaft 43 being provided with a crank handle 45.

In the use of the decking apparatus, the same is shifted longitudinally of the car wall when the track rails 4 and 5 are in the desired position and by rotating the screw shaft 6 by the gear mechanism in the gear casing 39, with the screw jaws 27 associated with the arm 19 engaged with the screw shaft, the cross arm 19 and block 22 are raised or lowered to position the cross arm at the proper elevation and when this has been attained, the pins 30 in the casing 22 and the cross arm are moved into engagement with the car wall 2 for anchoring the cross arm and simultaneously disengaging the screw jaws 27 from the shaft 6 so that continued rotation of the screw shaft will alone effect the lower lock 22 for correctly positioning the head 15 of the decking apparatus in position for the support of an automobile. When the automobile has been mounted in the decking structure, further rotation of the screw shaft will fail to raise the block 22 in the presence of an automobile supported in the decking structure with the result that the screw shaft will move downwardly through its splined connection 42 with the bevel gear 41 and thread through the block 22 with its lower terminal conical end 16 impinging or biting into the car floor 1 as shown in Figures 1 and 2, this longitudinal movement of the screw shaft being permitted by the resilient character of the strap hanger 8 of the upper carriage with the result that the decking structure is rigidly anchored in car supporting position. It is further intended to elevate an automobile into supporting relation with respect to the decking apparatus and when so supported, the decking apparatus and decked automobile may be shifted in the car, guided in such movements by the decking apparatus including the guide rails so that the automobile may be loaded at a desired position, for instance, adjacent a car door opening, and later shifted to either end of the car, or other point, where the automobile and decking apparatus are anchored in a manner as previously described.

In the form of invention shown in Figures 8 to 11, there is provided a single upper guide rail 4a while the lower guide rail 5a has a cut away portion 46 aligned with a hanger 47 depending from the roof 3 of the car. In lieu of the resilient strap 8 for the wheeled carriage at the upper end of the screw rod as shown in Figures 1 and 2, the carriage for the upper end of the screw shaft 6 includes a pair of ears 9a on which the wheels 10a are journalled, the ears 9a forming a part of a hinge member 48 including a hinged lug 49 with which the head 7 of the screw 6 is engaged. When the decking structure illustrated in Figures 8 to 11 is out of use, the same is shifted to align the lower carriage for the screw shaft 6 with the cut out portion 46 of the lower rail 5a and at which time the screw shaft and decking devices carried thereby are swung upon the hinge member 47 at the upper end of the screw shaft with the lower end of the decking structure elevated to be engaged with the hanger 47 as shown in Figures 9 to 11 for occupying a minimum of space within the car and completely clearing the side walls 2 thereof.

While there are herein shown and described the preferred embodiments of the invention, it is nevertheless to be understood that minor changes may be made therein without departing from the spirit and scope of the invention as claimed.

I claim:—

1. In decking apparatus of the character described, a vertical screw shaft, a roller carriage support for mounting the ends of the shaft on the wall of a car, and a deck structure including a head, means vertically adjustable on the screw shaft, and arms connecting the head to said means.

2. In decking apparatus of the character described, a vertical screw shaft, a block through which the shaft is threaded and a cross arm through which the shaft extends, means to place the cross arm in threaded engagement with the shaft, and a deck head having brace arm connections with the block and cross arm.

3. In decking apparatus of the character described, a vertical screw shaft, a block through which the shaft is threaded and a cross arm through which the shaft extends, means to place the cross arm in threaded engagement with the shaft, means for rotating the screw shaft, and a deck head having brace arm connections with the block and cross arm.

4. In decking apparatus of the character described, a vertical screw shaft, a block through which the shaft is threaded and a cross arm through which the shaft extends, means to place the cross arm in threaded engagement with the shaft, comprising slidably mounted screw jaws, and a deck head having brace arm connections with the block and cross arm.

5. In decking apparatus of the character described, a vertical screw shaft, a block through which the shaft is threaded and a cross arm through which the shaft extends, means to place the cross arm in threaded engagement with the shaft, comprising slidably mounted screw jaws, means for rotating the screw shaft, and a deck head having brace arm connections with the block and cross arm.

6. In decking apparatus of the character described, a vertical screw shaft, a block through which the shaft is threaded and a cross arm through which the shaft extends, means to place the cross arm in threaded engagement with the shaft, a gear train with one of the gears having a spline connection with the screw shaft for rotating the shaft, and a deck head having brace arm connections with the block and cross arm.

7. The combination with a freight car wall, having upper and lower longitudinal guide rails, of a decking structure including a vertical screw shaft with a wheeled carriage movable over the guide rails, a screw block through which the shaft is threaded and a cross arm through which the shaft extends, means for rotating the shaft, a deck head having brace arm connections with the screw block and cross arm, and means associated with the arm for placing the same in engagement with the screw shaft.

8. The combination with a freight car wall, having upper and lower longitudinal guide rails, of a decking structure including a vertical screw shaft with a wheeled carriage movable over the guide rails, a screw block through which the shaft is threaded and a cross arm through which the shaft extends, means for rotating the shaft, a deck head having brace arm connections with the screw block and cross arm, means associated with the arm for placing the same in engagement with the screw shaft, and means cooperating with the aforesaid means for separating the arm from the shaft and locking the cross arm to the car wall.

9. The combination with a freight car wall, having upper and lower longitudinal guide rails, of a decking structure including a vertical screw shaft with a wheeled carriage movable over the guide rails, a screw block through which the shaft is threaded and a cross arm through which the shaft extends, means for rotating the shaft, a deck head having brace arm connections with the screw block and cross arm, and means associated with the arm for placing the same in engagement with the screw shaft, including a pair of slidably mounted screw jaws and means for shifting the jaws.

10. The combination with a freight car wall, having upper and lower longitudinal guide rails, of a decking structure including a vertical screw shaft with a wheeled carriage movable over the guide rails, a screw block through which the shaft is threaded and a cross arm through which the shaft extends, means for rotating the shaft, a deck head having brace arm connections with the screw block and cross arm, means associated with the arm for placing the same in engagement with the screw shaft, and means cooperating with the aforesaid means for separating the arm from the shaft and locking the cross arm to the car wall, including a pair of slidably mounted screw jaws, pins passing through the arm and having a cam engagement with the screw jaws, and means for moving the pins into engagement with the car wall for anchoring the cross arm and spacing the screw jaw from the screw shaft.

11. The combination with a freight car wall, having upper and lower longitudinal guide rails, of a decking structure including a vertical screw shaft with a wheeled carriage movable over the guide rails, a screw block through which the shaft is threaded and a cross arm through which the shaft extends, means for rotating the shaft, a deck head having brace arm connections with the screw block and cross arm, means associated with the arm for placing the same in engagement with the screw shaft, and means cooperating with the aforesaid means for separating the arm from the shaft and locking the cross arm to the car wall, including a pair of slidably mounted screw jaws, pins passing through the arm and having a cam engagement with the screw jaws, and means for moving the pins into engagement with the car wall for anchoring the cross arm and spacing the screw jaws from the screw shaft, said pins when moved in the opposite direction freeing the cross arm from the wall and engaging the screw jaws with the screw shaft.

12. The combination with a freight car wall, having upper and lower longitudinal guide rails, of a decking structure including a vertical screw shaft with a wheeled carriage movable over the guide rails, a screw block through which the shaft is threaded and a cross arm through which the shaft extends, means for rotating the shaft, a deck head having brace arm connections with the screw block and cross arm, means associated with the arm for placing the same in engagement with the screw shaft, the upper end of the screw shaft having a pivot connection with the upper carriage, the lower guide rail having a cut-away portion permitting transverse swinging movement of the decking structure, and a hanger on the roof of the car to receive the lower elevated end of the structure.

13. In decking apparatus of the character described, a vertical screw shaft, a cross arm and block thereon, a deck head having brace arm connections with the block and cross arm, means for rotating the shaft for raising and lowering the deck head, said block being threaded on the shaft, and means associated with the cross arm for placing the same into and out of engagement with the shaft.

14. In decking apparatus, a perpendicular shaft, a roller carried support for mounting the ends of the shaft on the wall of a car, a deck structure including a head, separate means vertically adjustable on the shaft, the upper one of which includes a cross arm, an arm connecting the head to the lower one of said means and spaced arms connecting the head to the outer ends of the cross arm.

15. In decking apparatus, a perpendicular support, spaced members adjustably secured to the support and a deck head having brace arm connections with said spaced members, each of said spaced members being independently adjustable on the support, and means to effect simultaneous adjustment of said members on the support.

16. In combination with a freight car having upper and lower longitudinally extending guide rails, of a decking structure including an automobile support and means guided by said rails whereby a decked automobile may be shifted longitudinally of the car with the decking structure and means for anchoring the decking structure against movement.

17. The combination with a freight car having upper and lower longitudinal guide rails, of a decking structure including means slidably associated with the upper and lower guide rails, the upper slide means including a hinge and the lower rails having cut-outs whereby the decking structure may be pivotally swung toward the roof of the car when out of use.

18. The combination with a freight car having upper and lower longitudinal guide rails, of a decking structure including means slidably associated with the upper and lower guide rails, the upper slide means including a hinge and the lower rails having cut-outs whereby the decking structure may be pivotally swung toward the roof of the car when out of use, and means carried by the car roof for holding the lower end of the decking structure adjacent the car roof.

In testimony whereof I affix my signature.

CLIFFORD L. SNYDER.